United States Patent
Yamaguchi et al.

(10) Patent No.: US 8,326,144 B2
(45) Date of Patent: Dec. 4, 2012

(54) TRANSMISSION PATH MONITORING METHOD AND DEVICE

(75) Inventors: Katsuji Yamaguchi, Fujisawa (JP); Junichi Yoshimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 560 days.

(21) Appl. No.: 12/559,768

(22) Filed: Sep. 15, 2009

(65) Prior Publication Data

US 2010/0027993 A1    Feb. 4, 2010

Related U.S. Application Data

(63) Continuation of application No. PCT/JP2007/055735, filed on Mar. 20, 2007.

(51) Int. Cl.
*H04B 10/08* (2006.01)
*H04B 17/00* (2006.01)
*H04B 13/02* (2006.01)

(52) U.S. Cl. ............... 398/33; 398/31; 398/32; 398/105

(58) Field of Classification Search ............... 98/30–33, 98/104, 105
See application file for complete search history.

(56) References Cited

U.S. PATENT DOCUMENTS

| | | | | |
|---|---|---|---|---|
| 5,453,827 | A | * | 9/1995 | Lee .............................. 356/73.1 |
| 5,559,909 | A | | 9/1996 | Anderson et al. |
| 2002/0044314 | A1 | | 4/2002 | Michishita |
| 2007/0133922 | A1 | * | 6/2007 | Murphy et al. ................. 385/12 |

FOREIGN PATENT DOCUMENTS

| | | |
|---|---|---|
| JP | 9-105875 | 4/1997 |
| JP | 2002-44037 | 2/2002 |
| JP | 2002-62217 | 2/2002 |
| JP | 2003-244080 | 8/2003 |

OTHER PUBLICATIONS

Japanese Office Action dated Jul. 19, 2011 in corresponding Japanese Patent Application 2009-505037.
International Search Report for PCT/JP2007/055735, mailed May 15, 2007.

* cited by examiner

*Primary Examiner* — Nathan Curs
(74) *Attorney, Agent, or Firm* — Staas & Halsey LLP

(57) ABSTRACT

Upon transmission path monitoring, when a monitoring signal responded by one of optical repeaters provided in a main signal transmission path is superposed on an optical main signal and sent out to the main signal transmission path, the optical main signal is branched to optical fibers, that are optical transmission paths, provided separately from the main signal transmission path and each provided with optical repeaters corresponding to the optical repeaters provided in the main signal transmission path, an optical main signal is selected from a desired optical fiber to be monitored from among the optical transmission paths and the monitoring signal is extracted from the optical main signal selected, thereby checking the quality of the desired optical fiber.

14 Claims, 7 Drawing Sheets

TRANSMISSION PATH MONITORING METHOD AND DEVICE

CROSS-REFERENCE TO RELATED APPLICATION

This application is a continuation of International Application PCT/JP2007/55735 filed on Mar. 20, 2007, the contents of which are herein wholly incorporated by reference.

FIELD

The embodiments discussed herein are related to a transmission path monitoring method and device for monitoring optical fibers.

BACKGROUND

A "dark fiber" that forms an optical transmission path in a system using an optical submarine cable is a pair of optical fibers unconnected to or unequipped with a submarine line terminal equipment (hereinafter, occasionally abbreviated as SLTE) at the initial stage, each being provided with optical repeaters. For monitoring such a dark fiber, a submarine optical repeater-monitoring dedicated device (for example a Coherent-OTDR measuring instrument (external measuring instrument by OTDR applied to an optical amplifying system using Coherent light)) independent of an optical submarine cable accommodating a pair of optical fibers as a main signal transmission path connected to or equipped with the SLTE has been heretofore employed.

A dark fiber monitoring system as related art is depicted in FIG. 7, in which an SLTE 1 in a terminal station 100 is connected to an SLTE 1 in a terminal station 300 through a pair of main signal optical fibers LF. Between the terminal stations 100 and 300, dark fibers DF1-DFn each composed of a pair of optical fibers are connected in parallel with the above optical fibers LF. To the dark fibers DF1-DFn, the SLTE 1 is not connected.

In operation of a main signal route of the SLTE 1 in the terminal station 100, an optical main signal is outputted from a main signal transmitting portion (Tx) 3, division multiplexed at an optical wavelength division multiplexer (WDM) 4, amplified at an optical amplifier 5 and sent to a variable optical attenuator (VOA) 6 that is a modulator.

On the other hand, a monitoring signal generator 9 having received a monitoring request command CMD from a network management system (NMS) connected to the SLTE 1 through a maintenance processor (MP) 8 converts the monitoring request command CMD into a monitoring (supervising) signal SV to be provided to the variable optical attenuator 6. This variable optical attenuator 6 amplitude modulates the optical main signal from the optical amplifier 5 with the monitoring signal SV from the monitoring signal generator 9 to be sent out to the optical fiber LF.

In the optical fiber LF between the terminal stations 100 and 300, a plurality of optical repeaters (REP) 200_1, 200_2, ..., 200_j, 200_k (hereinafter, occasionally represented by a reference numeral 200) are set, where the optical repeaters 200 are respectively provided with a module (subsystem) 20_0, which includes an optical amplifier 21 in the direction from the terminal station 100 to the terminal station 300 and an optical amplifier 22 in the opposite direction (see FIG. 3 as undermentioned).

The optical output signal, superposed with the monitoring signal SV, outputted from the variable optical attenuator 6 in the SLTE 1 of the terminal station 100 is sent for the SLTE 1 in the terminal station 300 through the optical repeaters 200 in the main signal optical fiber LF, as well as responded by the optical repeaters 200 and sent back to the SLTE 1 in the terminal station 100.

In the SLTE 1 of the terminal station 100, the optical main signal after passing through the optical coupler 11 and the optical amplifier 12 is demultiplexed per wavelength by a wavelength division demultiplexer (WDM) 13 and then received by main signal receiving portions (Rx) 14.

On the other hand, from the optical main signal branched at the optical coupler 11, the monitoring signal SV returned from the optical repeaters 200 is extracted by a monitoring signal extractor 15 and sent to the network monitoring system 2 through the maintenance processor 8.

The above signal flow is similarly applied to the optical main signal sent from the SLTE 1 in the terminal station 300 to the SLTE in the terminal station 100 through the main signal optical fiber LF, so that the optical main signal is returned to the SLTE 1 in the terminal station 300 through the optical repeaters 200.

It is to be noted that the monitoring signal SV sent toward the optical repeaters 200 will be hereinafter occasionally referred to as a monitoring request signal (SVC) and the monitoring signal SV returned from the optical repeaters 200 will be hereinafter occasionally referred to as a monitoring response signal (SVR).

The monitoring response signal (SVR) may include the following signals:
(1) Optical input power of the submarine optical repeaters;
(2) Optical output power of the submarine optical repeaters;
(3) LD bias current.

On the other hand, to the dark fibers DF1-DFn unconnected to the SLTE 1, by connecting the optical repeater-monitoring dedicated devices 30 respectively provided in the terminal stations 100 and 300 the optical repeaters 200 are monitored. Each of the optical repeaters 200 in the dark fibers DF1-DFn is provided with "n" pieces of modules 20_1-20_n respectively corresponding to the "n" dark fibers. The optical repeater-monitoring dedicated devices 30 check which of the dark fibers DF is/are maintained normal, and also check up to which optical repeater the main signal transmission path is maintained normal based on the dark fibers having been checked to be normal.

As one example of the above noted related art, there is a dark fiber supervisory testing device and apparatus, in which a test optical signal is made incident onto the dark fiber from a light source in a station for a facility rental enterprise via a multiplexer/demultiplexer section at one end, the optical signal is received at the other end of the dark fiber in a user building a via multiplexer/demultiplexer at the other end, a result of the received light is returned to one end of the dark fiber, received at one end via the multiplexer/demultiplexer at one end side, a control/notice unit calculates the optical transmission characteristic of the dark fiber and informs the user about it via a user unit (see e.g. Japanese Laid-open Patent Publication No. 2003-244080).

The related art as depicted in FIG. 7 has required a dedicated device for exclusively monitoring dark fibers forming optical transmission paths, resulting in a high system cost and complicated managements.

Also, a Coherent-OTDR measuring instrument (testing device) as one example of the optical repeater-monitoring dedicated device is one used for a fault search, so that it is not suitable for a full time monitoring over 24 hours and 365 days.

Furthermore, in case of a plurality of dark fibers used it is disadvantageous that the optical repeater-monitoring dedicated devices are required to be manually switched and connected to the dark fibers and therefore can not be remotely operated, failing to monitor all of the optical fibers by a simple operation.

SUMMARY

According to an aspect of the embodiment, a transmission path monitoring method (or device) includes: superposing (or superposing portion to superpose) a monitoring signal responded by one of optical repeaters provided in a main signal transmission path on an optical main signal to be transmitted to the main signal transmission path; branching (or branching portion to branch) the optical main signal to optical transmission paths provided separately from the main signal transmission path and each provided with optical repeaters corresponding to the optical repeaters provided in the main signal transmission path; selecting (or selecting portion to select) an optical main signal from a desired optical transmission path to be monitored from among the optical transmission paths; and extracting (or extracting portion to extract) the monitoring signal from the optical main signal selected.

The above-noted superposing process (or superposing portion) may include generating (or a portion to generate) the monitoring signal in response to a monitoring request command and modulating the optical main signal with the monitoring signal, or generating (or a portion to generate) the monitoring signal having a monitoring dedicated (exclusive use) wavelength in response to a monitoring request command to be coupled with the optical main signal.

The above-noted branching process (or branching portion) may include branching (or a portion to branch) the optical main signal to the desired optical transmission path.

Also, the selecting process (or selecting portion) may include sequentially switching (or a portion to sequentially switch) the optical transmission paths to be selected as the desired optical transmission path, or selecting (or a portion to select) the optical main signal from the main signal transmission path.

Also, the main signal transmission path and the optical transmission paths each may include a pair of optical fibers forming an optical submarine cable, and the optical transmission paths may include a dark fiber.

The object and advantages of the embodiment will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF THE EMBODIMENTS

There are two embodiments as undermentioned in case that a plurality of optical fiber pairs are equipped, to one of which a submarine line terminal equipment (SLTE) is connected, where optical transmission paths different from a main signal transmission path will be described referring to dark fibers but should not be limited to them:

(1) Embodiment (optical main signal branching system) for monitoring dark fibers by branching the optical main signal to the main signal transmission path as well as to the dark fibers, where this embodiment (1) includes embodiments (1a) and (1b);

(2) Embodiment (dedicated wavelength branching system) for monitoring the dark fibers by branching a signal of a monitoring dedicated wavelength coupled with the optical main signal on the main signal transmission path to the dark fibers, where this embodiment (2) includes embodiments (2a) and (2b).

Embodiment (1a)

FIGS. 1-3

Arrangement

Figure 1:
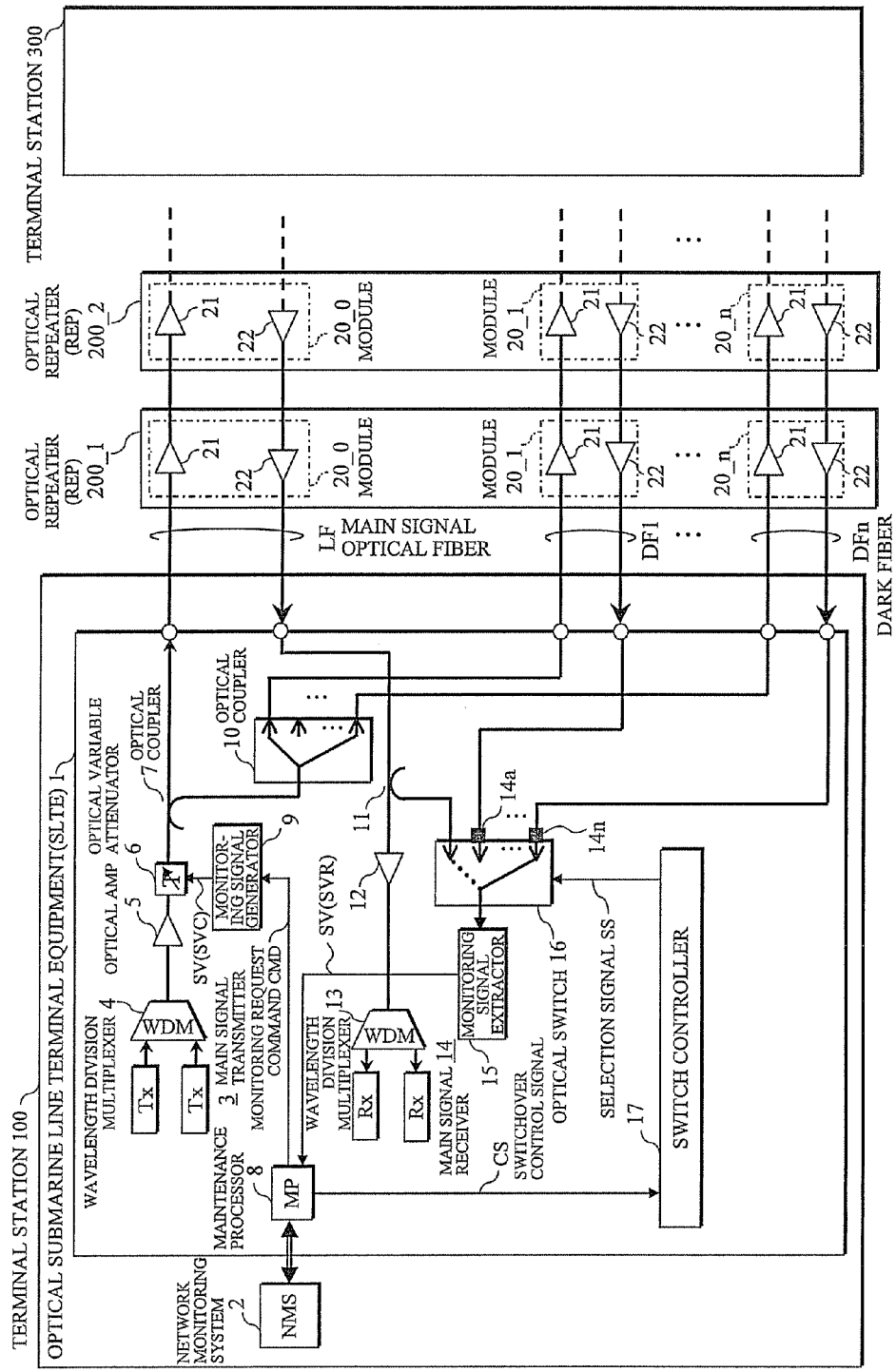
FIG. 1 is a block diagram depicting an embodiment (1a) of a transmission path (for example dark fiber) monitoring device.
Figure 7:
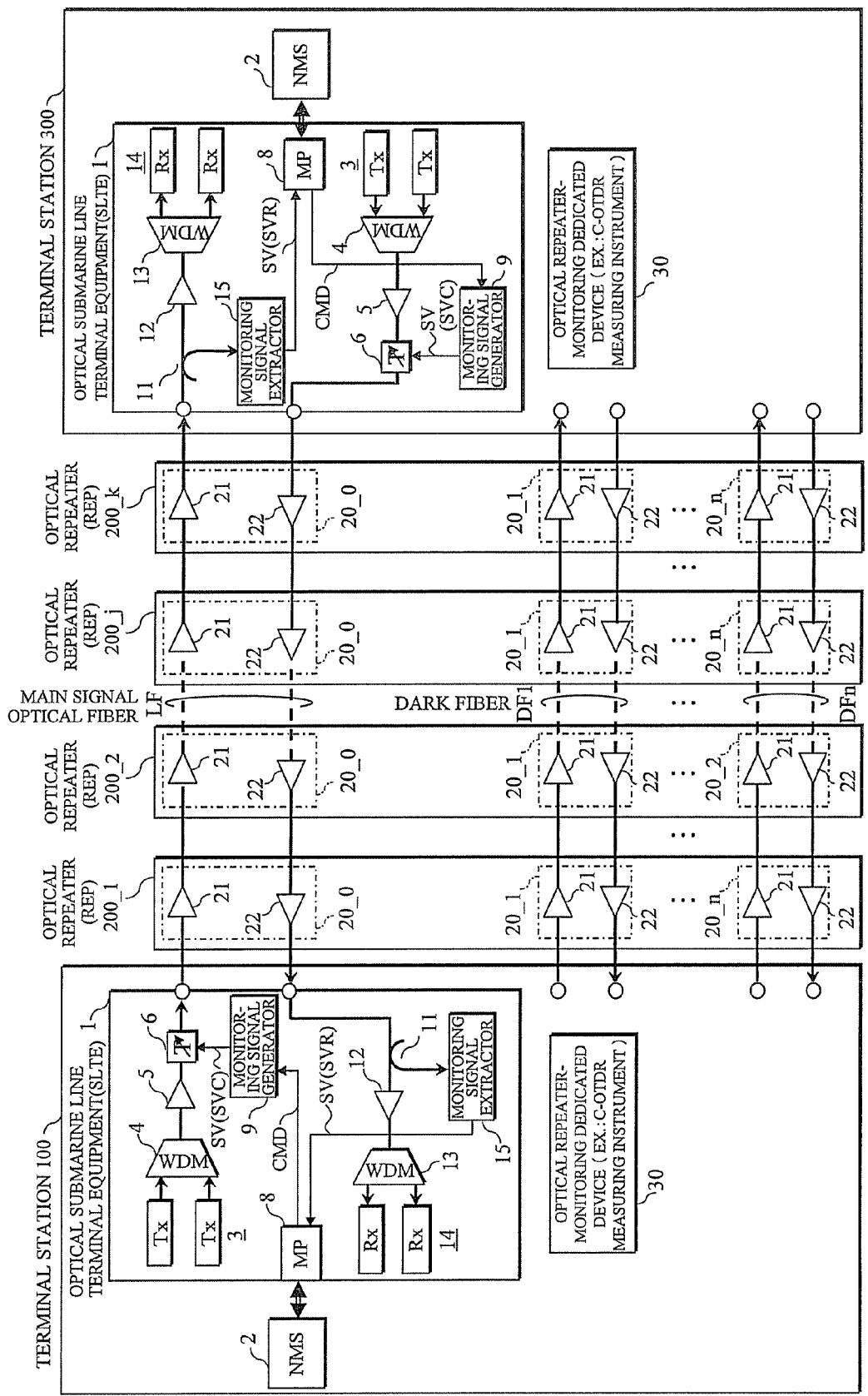
FIG. 7 is a block diagram depicting a transmission path monitoring device of the related art.

FIG. 1 depicts an embodiment (1a) of a device for implementing a transmission path monitoring method. This embodiment (1a) is different from the related art depicted in FIG. 7 in that there are additionally provided an optical coupler 7 which branches an output signal of a variable optical attenuator 6 in the SLTE 1, an optical coupler 10 which further branches the optical main signal branched by the optical coupler 7 to the dark fibers DF1-DFn, an optical switch 16 which selects a receiving signal from the dark fibers DF1-DFn through pads (fixed attenuators for level adjusting optical receiving signals) 14a-14n to be provided to the monitoring signal extractor 15 and a switch controller 17 which generates a selection signal SS for the optical switch 16 based on a switchover control signal CS from the maintenance processor 8 for instructing to select a desired dark fiber to be monitored.

*Operation

Figure 2:
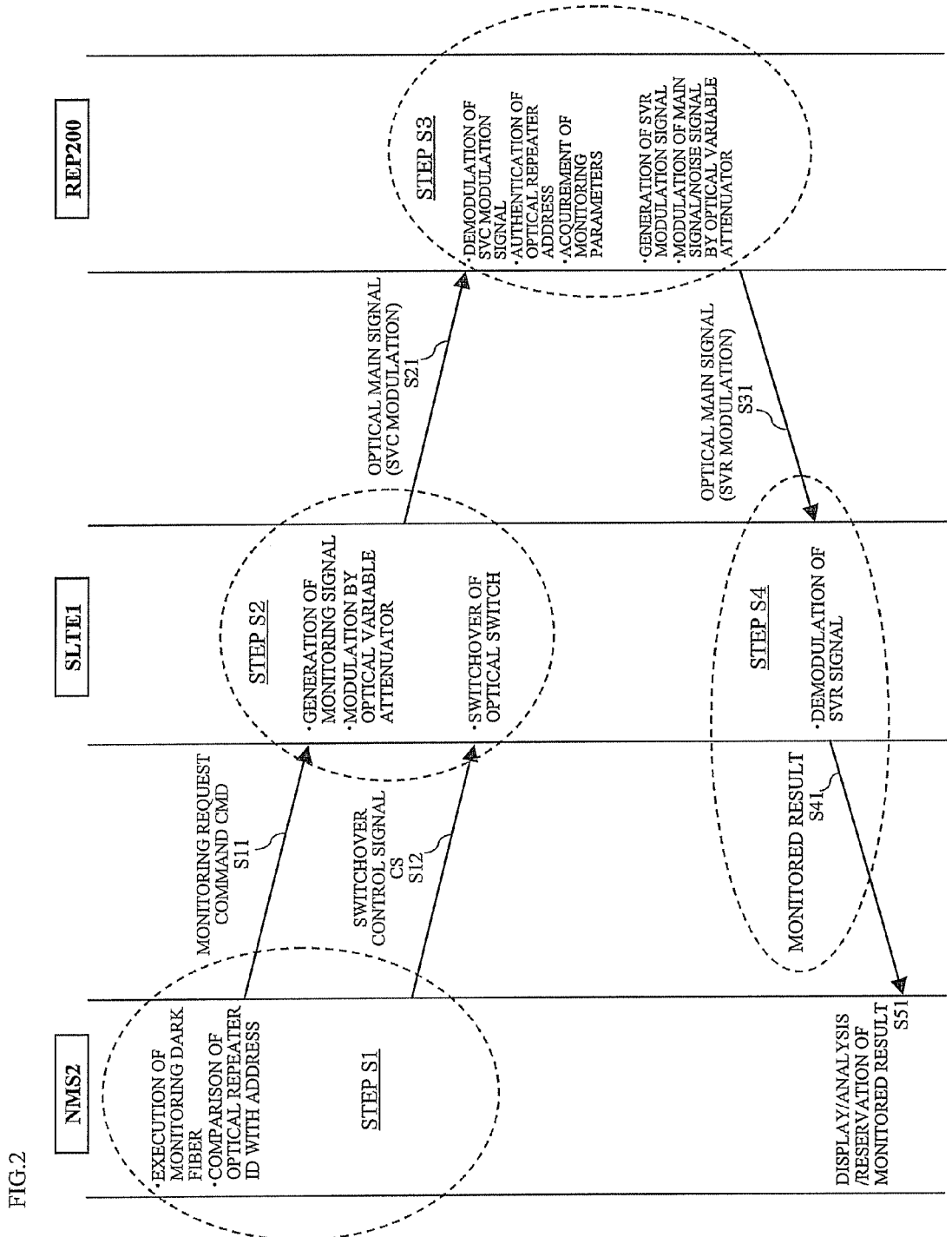
FIG. 2 is a sequence diagram depicting an operation of the above embodiment (1a)

<Step S1 (FIG. 2): Network Monitoring System 2>

It is here supposed that the network monitoring system 2 holds optical repeater information of the main signal optical fibers LF as well as optical repeater information of the dark fibers DF1-DFn in the form of a database as follows:

1) Optical repeater number (ID): This is a number uniquely given to an optical repeater;

2) Address of optical repeater (REP Address): This is an address uniquely given to a module of an optical repeater;

3) Optical repeater install information (Straight Line Diagram): This indicates a location (sequence) where the optical repeaters are arranged such as terminal station 100—optical repeater ID—optical repeater ID— . . . —terminal station 300.

The network management system 2 selects an optical repeater on the dark fibers to be monitored and a monitorable parameter. The network management system 2 checks the optical repeater ID with the optical repeater address to identify the optical repeater ID and the address to be monitored, and transmits a monitoring request command CMD to the SLTE 1 (step S11).

Concurrently, the network management system 2 checks the dark fibers to be monitored from the optical repeater ID and address to be monitored, and transmits the switchover control signal CS to the switch controller 17 through the maintenance processor 8 to select the corresponding dark fiber to be monitored (step S12).

<Step S2: SLTE 1>

The SLTE 1 receives the monitoring request command CMD from the network monitoring system 2 through the maintenance processor 8 and transmits it to the monitoring signal generator 9, which generates a monitoring signal SV (monitoring request signal SVC) to be provided to the variable optical attenuator 6 as a modulator. The variable optical attenuator 6 modulates the optical main signal generated by the wavelength division multiplexer 4 with the monitoring request signal SVC from the monitoring signal generator 9.

The optical main signal modulated with the monitoring request signal SVC is sent to the optical coupler 7, where it is branched to the main signal optical fiber LF as well as the optical coupler 10. The optical main signal sent to the optical coupler 10 is further branched (distributed) to all of the dark fibers DF1-DFn by the optical coupler 10, whereby the monitoring request signal SVC superposed on the optical main signal is to be transmitted to the optical repeaters 200 through the main signal optical fibers LF as well as the dark fibers DF1-DFn (step S21).

The switchover of the optical switch 16 is made by the selection signal SS from the switch controller 17 in response to the switchover control signal CS.

<Steps S3: Optical repeater 200>

Figure 3:
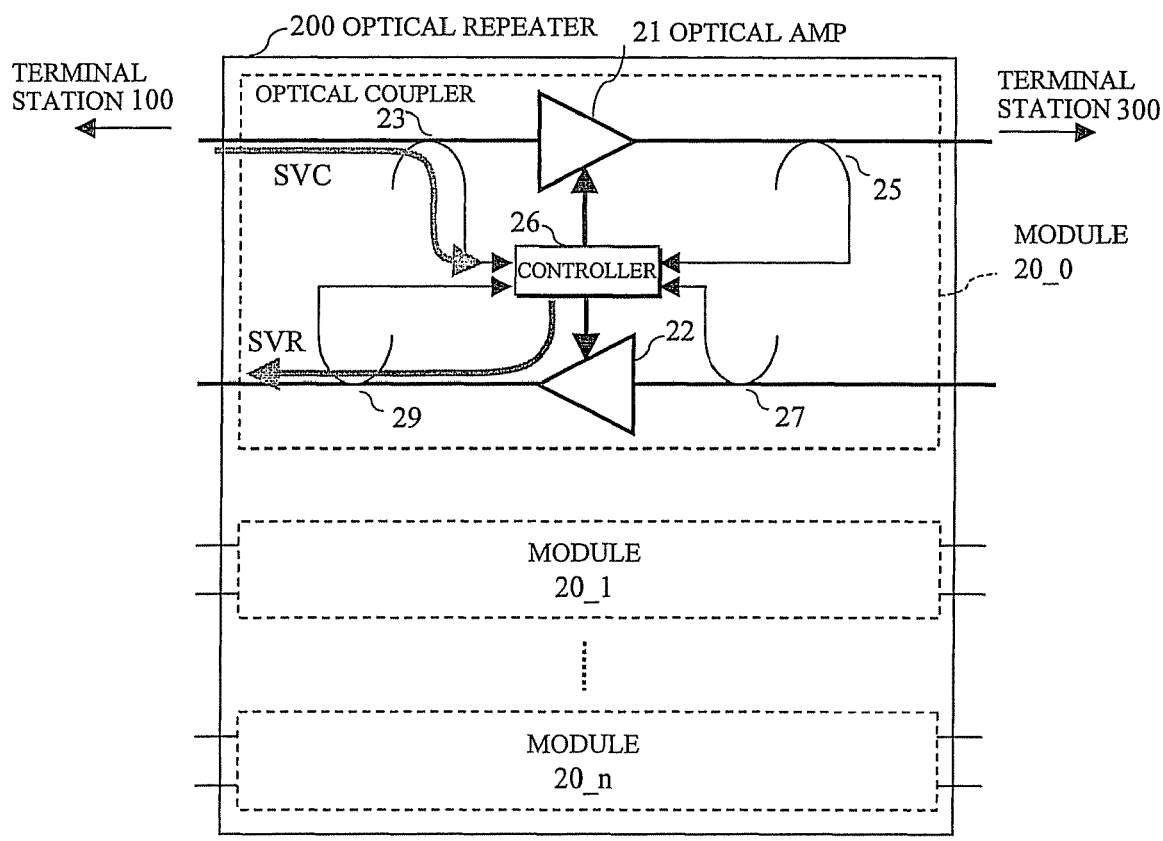
FIG. 3 is a block diagram depicting an arrangement of an optical repeater known in the art.
Figure 4:
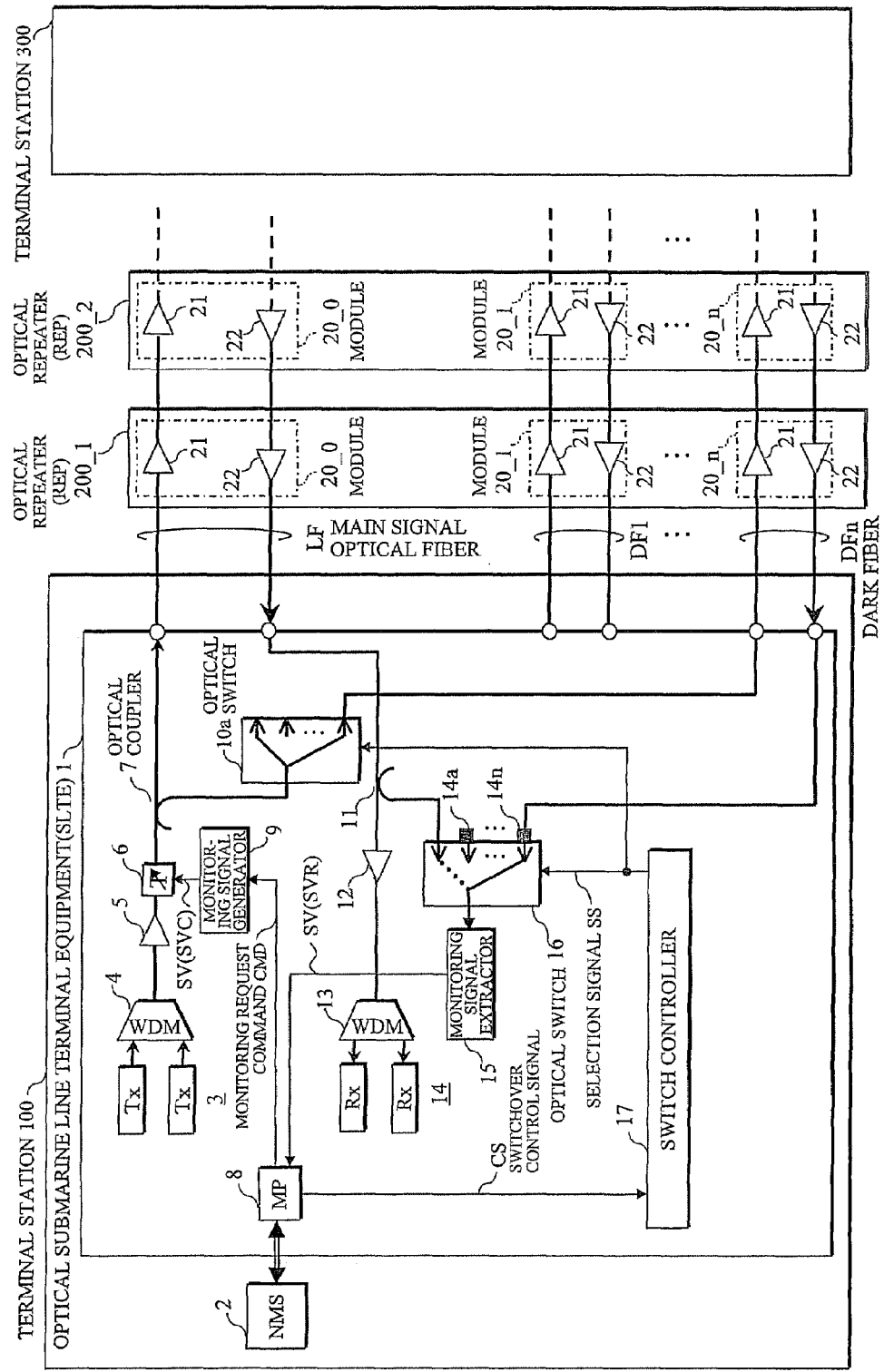
FIG. 4 is a block diagram depicting an embodiment (1b) of the transmission path monitoring device.
Figure 5:
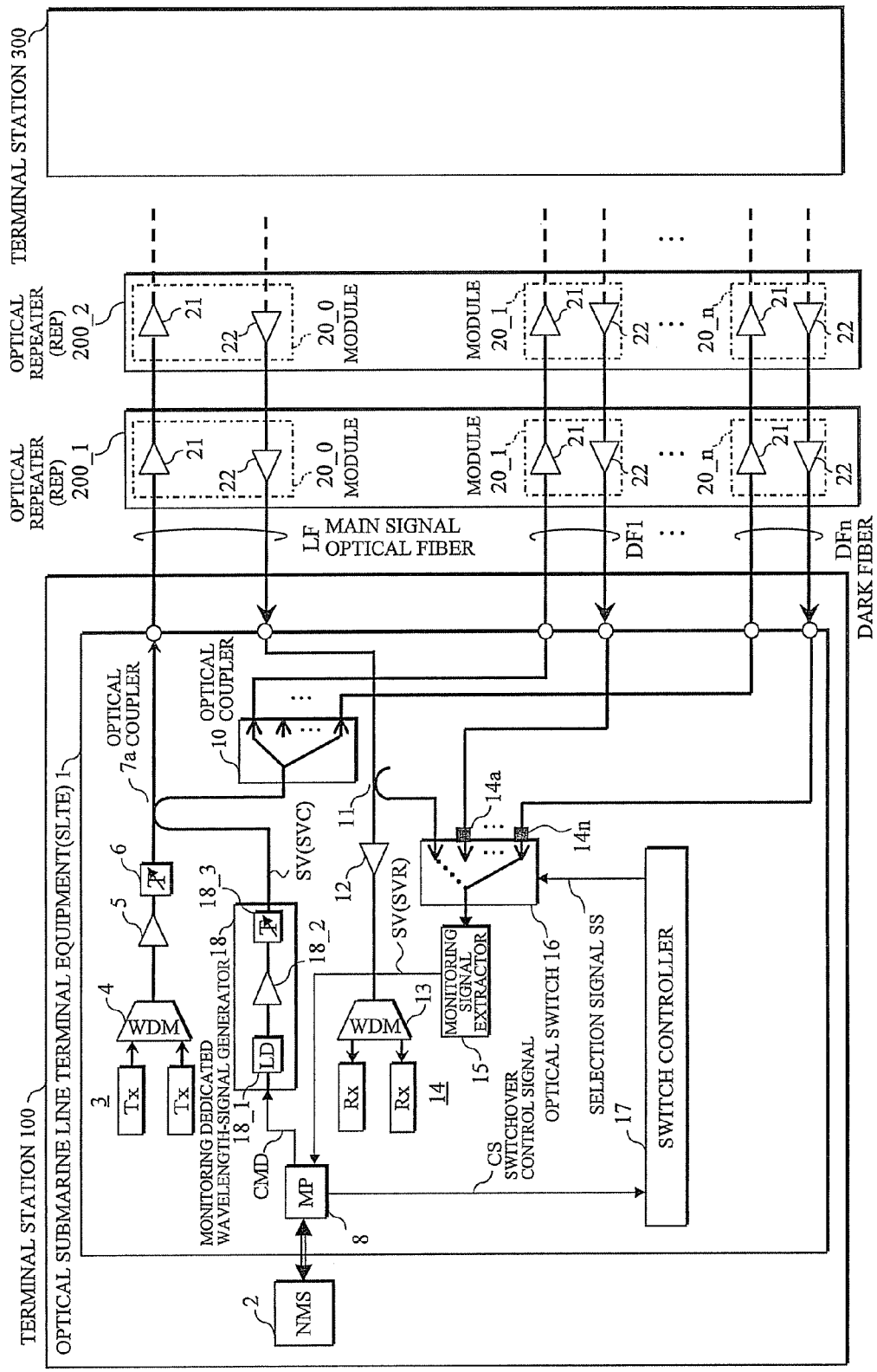
FIG. 5 is a block diagram depicting an embodiment (2a) of the transmission path monitoring device.
Figure 6:
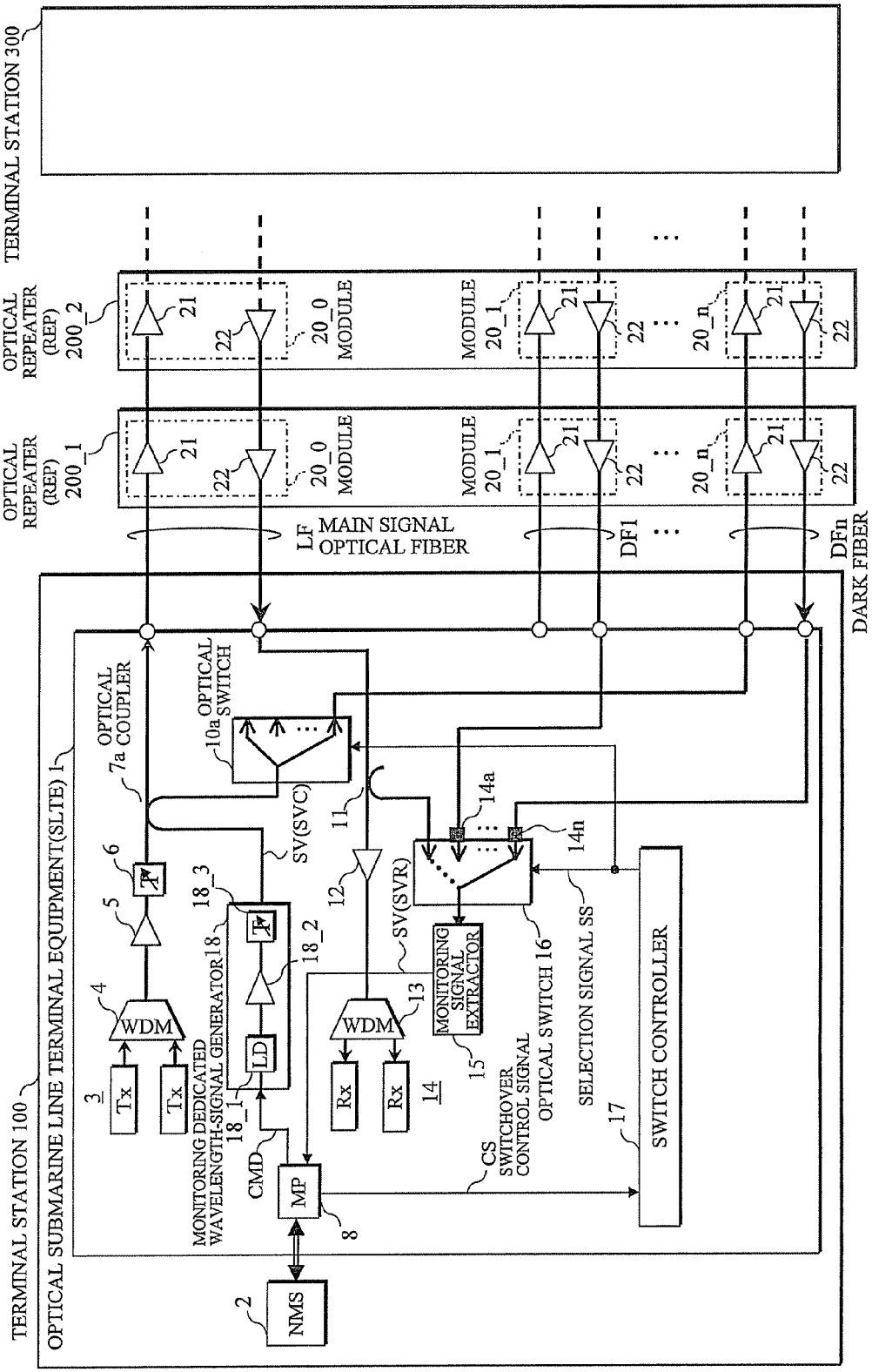
FIG. 6 is a block diagram depicting an embodiment (2b) of the transmission path monitoring device.

The optical repeaters 200 have an arrangement as depicted in FIG. 3, which is known in the art. Namely, each of the optical repeaters 200 comprises (n+1) pieces of modules 20_0-20_n (hereinafter, occasionally represented by a reference numeral 20) for the main signal optical fiber LF plus dark fibers DF1-DFn, where the optical amplifiers 21 and 22 in all of the modules 20 are put in the active state (light emitting state) by a power supply (not depicted) from a land station. The optical repeaters 200 include a controller 26 receiving the monitoring request signal SVC transmitted from the SLTE 1 by module (subsystem) and superposing the monitoring response signal SVR on the optical main signal.

Specifically, the optical main signal is branched by the optical coupler 23 to the optical amplifier 21 as well as the controller 26. The controller 26 demodulates the monitoring request signal SVC as a modulation signal to authenticate the optical repeater address. The optical repeater corresponding to the optical repeater address in the monitoring request signal SVC adjusts the exciting current of an exciting LD of the optical amplifier 22 on the receiving side (from the terminal station 300 to the terminal station 100) with monitored information of a parameter requested by the monitoring request signal SVC being made the monitoring signal SV (monitoring response signal SVR), thereby amplitude modulating the output signal of the optical amplifier 22, where reference numerals 25, 27 and 29 also designate optical couplers.

At this time, even in the absence of input signal to the optical amplifier 22 (no optical main signal is connected from the terminal station 300), by modulating autonomous sponteniou emission (ASE) generated from the optical amplifier 22 it becomes possible to transmit the monitoring response signal SVR to the SLTE 1 of the terminal station 100 (step S31).

<Step S4: SLTE 1>

The monitoring response signal SVR from the optical repeaters 200 is received at the optical switch 16 for selecting a fiber to be monitored by the SLTE 1 in the terminal station 100 through the pads 14a-14n. Also, the signal received from the main signal optical fiber LF is passed through the coupler 11 and the optical amplifier 12 to the wavelength division demultiplexer (WDM) 13, where it is branched to the main signal receivers 14 for each wavelength.

Since the optical switch 16 is given the selection signal SS through the switch controller 12 from the maintenance processor 8, the optical main signal from a desired dark fiber to be monitored and indicated by the selection signal SS is selected and transmitted to the monitoring signal extractor 15. The desired dark fiber to be monitored includes the optical fiber LF forming the main signal transmission path. The monitoring signal extractor 15 demodulates the monitoring response signal SVR and the monitored result is delivered to the network monitoring system 2 through the maintenance processor 8 (step S41).

The selection signal SS given from the switch controller 17 may be a signal for selecting all of the dark fibers DF1-DFn sequentially, a part of the dark fibers sequentially or a single specified dark fiber.

The network monitoring system 2 performs instructions, analyses and preservations of the monitored result (step S51).

Embodiment (1b)

FIG. 4

While in the above embodiment (1a) the main signal from the optical coupler 7 is transmitted to all of the dark fibers DF1-DFn in common by the optical coupler 10, in this embodiment (1b) an optical switch 10a is substituted for the optical coupler 10 so that the selection signal SS generated by the switch controller 17 is concurrently provided to the optical switch 10a.

Hereby, the optical main signal is not transmitted to all of the dark fibers DF1-DFn but only to a desired dark fiber selected as an object to be monitored by the optical switch 10a.

Embodiment (2a)

FIG. 5

This embodiment (2a) is different from the above embodiments (1a) and (1b) in that the monitoring signal generator 9 is replaced by a monitoring dedicated wavelength-signal generator 18 and a monitoring signal of a monitoring dedicated wavelength generated by the monitoring dedicated wavelength-signal generator 18 is coupled with the optical main signal at an optical coupler 7a. The monitoring dedicated wavelength-signal generator 18 comprises a series circuit of a laser diode (LD) 18_1, an optical amplifier 18_2 and a variable optical attenuator 18_3 between the maintenance processor 8 and the optical coupler 7a.

Namely, in the above embodiments (1a) and (1b), the optical main signal is amplitude modulated with the monitoring signal SVC, whereas in this embodiment (2a) no modulation is made at the variable optical attenuator 6, the monitoring signal SVC of the monitoring dedicated wavelength is coupled with the optical main signal from the variable optical attenuator 6 at the optical coupler 7a and the optical main signal coupled is branched by the optical coupler 7a to the main signal optical fiber LF as well as the optical coupler 10.

Accordingly, the optical repeaters 200 in this embodiment have a function, at the controller 26 depicted in FIG. 3, of wavelength demultiplexing the monitoring signal of the monitoring dedicated wavelength, wherewith the monitoring response signal SVR transmitted from the optical repeaters 200 the optical main signal is amplitude modulated under the adjustment of the driving current of the exciting LD on the output side of the optical amplifier 22 depicted in FIG. 3, to be similarly processed as with the above embodiments (1a) and (1b).

Embodiment (2b)

FIG. 6

This embodiment (2b) is different from the above embodiment (1b) in that as with the above embodiments (1a) and (2a), the monitoring signal generator 9 is replaced by the monitoring dedicated wavelength-signal generator 18, and its output signal SV is sent to the optical coupler 7a and branched to the optical switch 10a.

Therefore, the monitoring signal SVC of the monitoring dedicated wavelength is generated at the monitoring dedicated wavelength-signal generator 18, is then transmitted to the optical coupler 7a, is then branched to the optical coupler 7a, and at the optical switch 10a the optical main signal is transmitted only to a desired dark fiber to be monitored by the selection signal SS from the switch controller 17 in the same manner as the above embodiment (1b).

The other operations are the same as the above embodiment (1b).

Merits of Each System
(1) Main signal branching system: Because of utilizing no monitoring dedicated wavelength, an effective wavelength bandwidth is fully available for the main signal bandwidth;
(2) Exclusive wavelength branching system: In the absence of modulation to the main signal, transmission deterioration is less affected on the main signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions has (have) been described in detail, it should be understood that the various changes, substitutions, and alterations could be made hereto without departing from the spirit and scope of the invention.

The invention claimed is:

1. A transmission path monitoring method comprising:
   superposing a monitoring signal responded to by one of optical repeaters provided in a main signal transmission path on an optical main signal transmitted to the main signal transmission path;
   branching the optical main signal to optical transmission paths provided separately from the main signal transmission path and each provided with optical repeaters corresponding to the optical repeaters provided in the main signal transmission path;
   selecting an optical main signal from a desired optical transmission path to be monitored from among the optical transmission paths; and
   extracting the monitoring signal from the optical main signal selected.

2. The transmission path monitoring method as claimed in claim 1, wherein the superposing comprises generating the monitoring signal in response to a monitoring request command and modulating the optical main signal with the monitoring signal.

3. A transmission path monitoring method comprising:
   generating a monitoring signal having a monitoring dedicated wavelength in response to a monitoring request command;
   coupling the monitoring signal with an optical main signal transmitted to a main signal transmission path provided with optical repeaters;
   branching the optical main signal to optical transmission paths provided separately from the main signal transmission path and each provided with optical repeaters corresponding to the optical repeaters provided in the main signal transmission path;
   selecting an optical main signal from a desired optical transmission path to be monitored from among the optical transmission paths; and
   extracting the monitoring signal responded to by one of optical repeaters from the optical main signal selected.

4. The transmission path monitoring method as claimed in claim 1, wherein the branching comprises branching the optical main signal to the desired optical transmission path.

5. The transmission path monitoring method as claimed in claim 1, wherein the selecting comprises sequentially switching between the optical transmission paths to select the desired optical transmission path.

6. The transmission path monitoring method as claimed in claim 1, wherein the selecting comprises selecting the optical main signal from the main signal transmission path.

7. The transmission path monitoring method as claimed in claim 1, wherein the main signal transmission path and the optical transmission paths each comprise a pair of optical fibers forming an optical submarine cable, and the optical transmission paths comprise a dark fiber.

8. A transmission path monitoring device comprising:
   a superposing portion to superpose a monitoring signal responded to by one of optical repeaters provided in a main signal transmission path on an optical main signal transmitted to the main signal transmission path;
   a branching portion to branch the optical main signal to optical transmission paths provided separately from the main signal transmission path and each provided with optical repeaters corresponding to the optical repeaters provided in the main signal transmission path;
   a selecting portion to select an optical main signal from a desired optical transmission path to be monitored from among the optical transmission paths; and
   an extracting portion to extract the monitoring signal from the optical main signal selected.

9. The transmission path monitoring device as claimed in claim 8, wherein the superposing portion comprises a portion to generate the monitoring signal in response to a monitoring request command and to modulate the optical main signal with the monitoring signal.

10. A transmission path monitoring device comprising:
    generating portion to generate a monitoring signal having a monitoring dedicated wavelength in response to a monitoring request command;
    coupling portion to couple the monitoring signal with an optical main signal transmitted to a main signal transmission path provided with optical repeaters;
    branching portion to branch the optical main signal to optical transmission paths provided separately from the main signal transmission path and each provided with optical repeaters corresponding to the optical repeaters provided in the main signal transmission path;
    selecting portion to select an optical main signal from a desired optical transmission path to be monitored from among the optical transmission paths; and extracting portion to extract the monitoring signal responded to by one of optical repeaters from the optical main signal selected.

11. The transmission path monitoring device as claimed in claim 8, wherein the branching portion comprises a portion to branch the optical main signal to the desired optical transmission path.

12. The transmission path monitoring device as claimed in claim 8, wherein the selecting portion includes a portion to sequentially switch between the optical transmission paths to select the desired optical transmission path.

13. The transmission path monitoring device as claimed in claim 8, wherein the selecting portion comprises a portion to select the optical main signal from the main signal transmission path.

14. The transmission path monitoring device as claimed in claim 8, wherein the main signal transmission path and the optical transmission paths each comprise a pair of optical fibers forming an optical submarine cable, and the optical transmission paths comprise a dark fiber.

* * * * *